US009589376B2

(12) United States Patent
Hahn

(10) Patent No.: US 9,589,376 B2
(45) Date of Patent: Mar. 7, 2017

(54) MANIPULATION OF SPLINES BASED ON A SUMMARY SPLINE

(71) Applicant: Pixar, Emeryville, CA (US)

(72) Inventor: Tom Hahn, Piedmont, CA (US)

(73) Assignee: Pixar, Emeryville, CA (US)

( * ) Notice: Subject to any disclaimer, the term of this patent is extended or adjusted under 35 U.S.C. 154(b) by 10 days.

(21) Appl. No.: 14/796,897

(22) Filed: Jul. 10, 2015

(65) Prior Publication Data

US 2017/0011537 A1  Jan. 12, 2017

(51) Int. Cl.
*G06T 13/20* (2011.01)
*G06T 11/20* (2006.01)
*G06T 13/80* (2011.01)

(52) U.S. Cl.
CPC ............ *G06T 11/203* (2013.01); *G06T 13/80* (2013.01)

(58) Field of Classification Search
CPC ......... G06T 13/40; G06T 13/00; G06T 13/80; G06T 13/20; G06T 11/203; G06T 17/30; G06T 11/001; A63F 13/10; G06F 17/17; G09G 5/20
See application file for complete search history.

(56) References Cited

U.S. PATENT DOCUMENTS

| 2006/0227130 A1* | 10/2006 | Elchuri ................. G06T 11/203 345/419 |
| 2012/0230566 A1* | 9/2012 | Dean ...................... G06T 19/00 382/131 |
| 2013/0127889 A1* | 5/2013 | Winnemoeller ...... G06T 11/001 345/582 |

* cited by examiner

*Primary Examiner* — Todd Buttram
(74) *Attorney, Agent, or Firm* — Kilpatrick Townsend & Stockton

(57) ABSTRACT

A summary spline curve can be constructed from multiple animation spline curves. Control points for each of the animation spline curves can be included to form a combined set of control points for the summary spline curve. Each of the animation spline curves can then be divided into spline curve segments between each neighboring pair of control points in the combined set of control points. For each neighboring pair, the spline curve segments can be normalized and averaged to determine a summary spline curve segment. These summary spline curve segments are combined to determine a summary spline curve. The summary spline curve can then be displayed and/or modified. Modifications to the summary spline curve can result in modifications to the animation spline curves.

34 Claims, 12 Drawing Sheets

MANIPULATION OF SPLINES BASED ON A SUMMARY SPLINE

BACKGROUND

Spline curves are often used in computer animation to represent characteristics of objects over time. For example, an animation spline curve can be used to provide a value of an animation variable at a plurality of frames in the computer animation. A computer animator or other user can define control points at a subset of the frames in the animation. Each control point may have a control point value (e.g., a value of an animation variable at the frame), a control point tangent angle, and/or a control point tangent length. These control points can be used to generate a continuous animation spline curve, such as a Bezier curve, that interpolates the value of the animation variable between the control points.

By adjusting the control points of the animation spline curve until a desired shape of the curve is attained, an animator can define the value of the animation variable at a plurality of frames without having to manually specify the value of the animation variable for each of those frames. Thus, by defining animation spline curves for animation variables controlling an object, animators can more easily describe the behavior of the object over time.

In many cases, animation variables may be highly correlated. For example, an animation variable controlling the position of a character's top eyelid may be inversely correlated with an animation variable controlling the character's bottom eyelid. In other words, when the character opens or closes their eyes, the top eyelid may move in a similar but complementary fashion to the bottom eyelid. In order to control the position of the character's eyelid over time, an animator may define a first animation spline to control the top eyelid, and a second animation spline to control the bottom eyelid. However, in order to change the behavior of the eyelids over time (e.g., from closing quickly to closing slowly), an animator may have to manually alter both the control points for the first animation spline and those for the second animation spline. For animations where there are several correlated animation spline curves, this may be particularly laborious.

In addition, some correlated animation spline curves may have different dimensions or magnitudes than other animation spline curves, further complicating the process of concurrently altering such curves.

Embodiments of the present invention address these and other problems individually and collectively.

BRIEF SUMMARY

Embodiments of the invention relate to constructing a summary spline curve from a plurality of animation spline curves, and modifying the summary spline curve.

In some embodiments, a summary spline curve can be constructed from multiple animation spline curves. Control points for each of the animation spline curves can be included to form a combined set of control points for the summary spline curve. Each of the animation spline curves can then be divided into spline curve segments between each neighboring pair of control points in the combined set of control points. For each neighboring pair, the spline curve segments can be normalized and averaged to determine a summary spline curve segment. These summary spline curve segments are combined to determine a summary spline curve. The summary spline curve can then be displayed.

In some embodiments, a value of a control point in a summary spline curve can be modified. For example, a modified control point value and a current control point value can be received for a modified control point in the summary spline. If the modified control point is a local extreme, an amplitude factor can be determined using a difference between the modified control point value and the current control point value, and a control point value for a neighboring control point. The amplitude factor can then be used to determine a new control point value for a corresponding control point in each of the animation spline curves used to construct the summary spline curve. If the modified control point is not a local extreme, a favor factor can be determined using a difference between the modified control point value and the current control point value, and a control point value for a favored control point. The favor factor can then be used to determine a new control point value for a corresponding control point in each of the animation spline curves used to construct the summary spline curve.

In some embodiments, a tangent angle of a control point in a summary spline curve can be modified. For example, a modified control point tangent angle can be received for a modified control point in the summary spline curve. A control point neighborhood can be determined for the modified control point. Each animation spline curve used to construct the summary spline can then be normalized in the control point neighborhood, conformed to the modified control point tangent angle, and de-normalized in the control point neighborhood.

Other embodiments disclose systems comprising processors and memory configured to implement methods of constructing and/or modifying summary spline curves. Other embodiments disclose computer products comprising non-transitory computer-readable media storing code that causes one or more processors of a computer to implement methods of constructing and/or modifying summary spline curves.

TERMS

Figure 1:
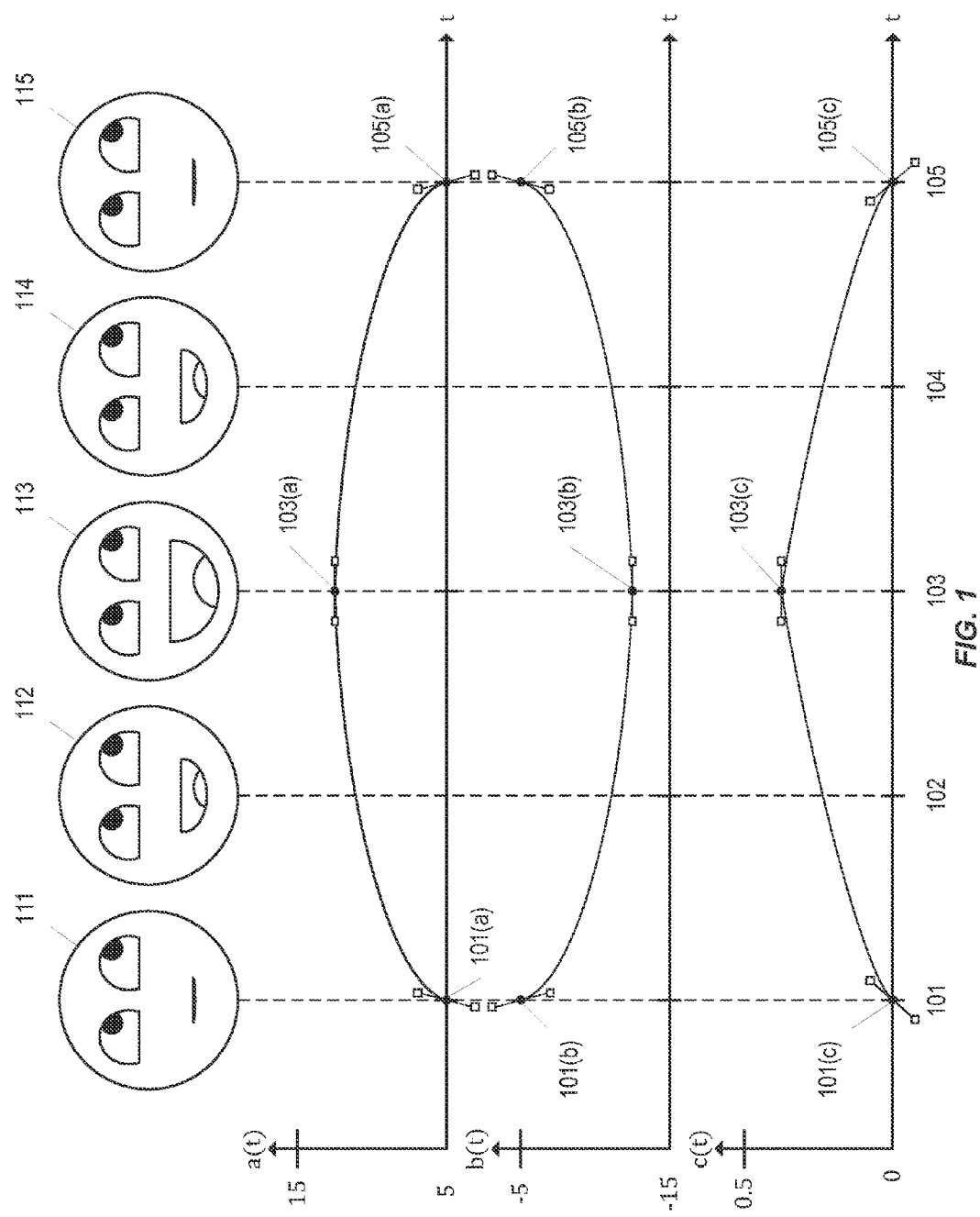
FIG. 1 shows a plurality of frames in a computer animation, and three animation spline curves corresponding to an object in the animation.

An "object" may include any suitable computer representation of part or all of an entity, such as a character, a landscape, an inanimate object, or any other virtual entity. Objects may be constructed, for example, out of geometrical vertices, edges, and faces in a 2D or 3D coordinate system.

An "animation variable" may include any variable or identifier that controls or influences some characteristic of an object or other aspect of a computer animation. For example, animation variables can be used to control the location of a character, the pose of a character, lighting characteristics of a scene, etc. An "animation variable value" can be defined for one or more frames in a computer animation directly by a user (e.g., an animator), using an animation spline curve, or in any other suitable manner.

An "animation spline curve" may include any function or other relation that represents the value of one or more animation variables at a plurality of times or frames. Typically, an animation spline curve is a continuous function such as a Bezier curve or other mathematical spline. An animation spline curve is typically defined using one or more control points.

A "control point" may include one of a set of points used to determine the shape of a spline curve or other relation. Typically, a control point is defined for a subset of frames or time values in an animation spline curve. Each control point can be associated several properties, such as a control point value, a control point tangent angle, and/or a control point tangent length, each of which can influence the shape of a spline curve constructed using the control point.

A "control point value" may include a value of a control point. Typically, the control point value of a control point influences the value of a spline curve at the location (e.g., the time or the frame) of the control point. The value of the animation spline curve at the location of the control point may be the control point value, but could instead be a different value. For animation spline curves that represent a single animation variable, a control point value can be expressed in terms of that variable.

A "control point tangent angle" may include a tangent angle associated with a control point. Typically, the control point tangent angle of a control point influences the angle or slope of the spline curve at the location of the control point.

A "control point tangent length" may include a length of a tangent associated with a control point. A control point tangent length may influence to what extent a spline curve conforms to a control point tangent angle for a control point. For example, a greater control point tangent length may result in a spline curve whose slope is similar to the control point tangent angle for a greater number of frames than if the control point tangent length was smaller.

A "summary spline curve" may include an animation spline curve that summarizes or represents a plurality of animation spline curves for a plurality of animation variables. Typically, a summary spline curve does not represent the value of a single animation variable over time, but rather more generally represents the shape of a plurality of animation variables over time.

A "neighboring control point" may include any control point that is adjacent or is otherwise closest in proximity to another control point. In some cases, a neighboring control point may be a control point directly preceding (i.e., the frame before) a control point, or following (i.e., the frame after) a control point. In other cases, there may be one or more frames in between neighboring control points.

A control point may be a "local extreme" if the control point value of the control point value is either greater than both neighboring control points (i.e., a "local maximum"), or less than both neighboring control points (i.e., a "local minimum").

A "control point neighborhood" may include any suitable plurality of control points in a spline curve. A control point neighborhood may be defined in any suitable manner. For example, in some cases, a control point neighborhood may include all control points preceding a control point until a local extreme control point is reached, and all control points subsequent to the control point until another local extreme control point is reached.

An "amplitude factor" may include any scalar, ratio, or other value that indicates an extent to which a control point value has been modified. An amplitude factor may be a function of any suitable data. For example, in some cases, an amplitude factor may be calculated using a ratio of a difference between a modified control point value and a current control point value, to a control point value for a neighboring control point.

A "favor factor" may include any scalar, ratio, or other value that indicates an extent to which a control point value has been modified. A favor factor may be a function of any suitable data. For example, in some cases, a favor factor may be calculated using a ratio of the difference between a modified control point value and a current control point value, to a control point value of a favored control point.

DETAILED DESCRIPTION

Embodiments of the invention relate to constructing a summary spline curve from a plurality of animation spline curves, and modifying the summary spline curve.

In some embodiments, a summary spline curve can be constructed from multiple animation spline curves. Control points for each of the animation spline curves can be included to form a combined set of control points for the summary spline curve. Each of the animation spline curves can then be divided into spline curve segments between each neighboring pair of control points in the combined set of control points. For each neighboring pair, the spline curve segments can be normalized and averaged to determine a summary spline curve segment. These summary spline curve segments are combined to determine a summary spline curve. The summary spline curve can then be displayed.

In some embodiments, a value of a control point in a summary spline curve can be modified. For example, a modified control point value and a current control point value can be received for a modified control point in the summary spline. If the modified control point is a local extreme, an amplitude factor can be determined using a difference between the modified control point value and the current control point value, and a control point value for a neighboring control point. The amplitude factor can then be used to determine a new control point value for a corresponding control point in each of the animation spline curves used to construct the summary spline curve. If the modified control point is not a local extreme, a favor factor can be determined using a difference between the modified control point value and the current control point value, and a control point value for a favored control point. The favor factor can then be used to determine a new control point value for a corresponding control point in each of the animation spline curves used to construct the summary spline curve.

In some embodiments, a tangent angle of a control point in a summary spline curve can be modified. For example, a modified control point tangent angle can be received for a modified control point in the summary spline curve. A control point neighborhood can be determined for the modified control point. Each animation spline curve used to construct the summary spline can then be normalized in the control point neighborhood, conformed to the modified control point tangent angle, and de-normalized in the control point neighborhood.

I. Introduction

Spline curves are often used in computer animation to represent characteristics of objects over time. For example, an animation spline curve can be used to represent a value of an animation variable at a plurality of frames in the computer animation. In order to construct an animation spline curve, a computer animator or other user can define control points at a subset of the frames in the animation. Each control point may have a control point value (e.g., a value of an animation variable at the frame), a control point tangent angle, and/or a control point tangent length. These control points can be used to generate a spline, such as a Bezier curve, that interpolates the value of the animation variable between the control points.

By adjusting the control points of the animation spline curve until a desired shape of the curve is attained, an animator can define the value of the animation variable at a plurality of frames without having to manually specify the value of the animation variable for each of those frames. Thus, by defining animation spline curves for animation variables controlling an object, animators can more easily describe the behavior of the object over time.

For example, FIG. 1 shows three animation variables that control various aspects of a character's mouth. An animation variable a controls the position of the top-left corner of the mouth. An animation variable b controls the position of the top-right corner of the mouth. An animation variable c controls the position of the bottom of the mouth. Animation spline curves a(t), b(t), and c(t) represent the values over time t of the animation variables a, b, and c, respectively.

As can be seen in FIG. 1, the character's face changes demeanor over frames 101-105. Specifically, the character starts from a neutral face 111 at frame 101, transitions to a smiling face 113 at frame 103, and returns back to a neutral face 115 at frame 105. The changes to the character's expression are reflected in each of the shown animation spline curves.

For example, at frame 101, spline curve a(t) has a control point 101(a) with a value of 5, indicating that the top-left corner of the character's mouth is in a position slightly to the left of the center of the character's face. At control point 103(a) on frame 103, spline curve a(t) then changes to a value of 12.5, indicating that the top-left corner of the character's mouth has moved leftward by 7.5 units. The shape of the curve of a(t) between frames 101 and 103 is influenced by the control point tangent angle of control point 101(a), which can be seen by the slope of the line passing through control point 101(a) between the two white boxes, and by the control point tangent angle of control point 103(a). Spline a(t) further comprises a control point 105(a), thus causing the spline to return to a value of 5 at frame 105.

Like spline a(t), spline b(t) has a control point 101(b) at frame 101. However, the control point value of control point 101(b) is −5, indicating that the top-right corner of the character's mouth is slightly to the right of the center of the character's face. Further, whereas spline a(t) rises to a maximum value of 12.5 at control point 103(a) on frame 103, spline b(t) decreases to a minimum value of −12.5 at control point 103(b) on frame 103. The increasing negative value indicates that that the top-right corner of the character's mouth has moved in the opposite direction to the top-left corner. At frame 105, spline b(t) comprises control point 105(b), which causes the spline to return to a value of −5.

Spline c(t) also comprises control points at frames 101, 103, and 105: points 101(c), 103(c), and 105(c), respectively. Like spline a(t), spline c(t) rises to a local maximum at frame 103 (rising to a maximum value of 0.375). However, whereas the curve of spline a(t) is fairly concave, the curve of spline c(t) is less so due to the less steep control point tangent angles defined for control points 101(c) and 105(c).

In some cases, animation spline curves can be highly correlated. For example, all three animation spline curves in FIG. 1 follow a similar pattern: they start from a neutral value at frame 101, transition to a local extreme at frame 103, and return back to the neutral value at frame 105. In some sense, this is intuitive: as any person transitions between a neutral expression and a smile, the top-left, top-right, and bottom of the person's mouth move in concert.

A. Modifying Animation Spline Curves

Figure 2:
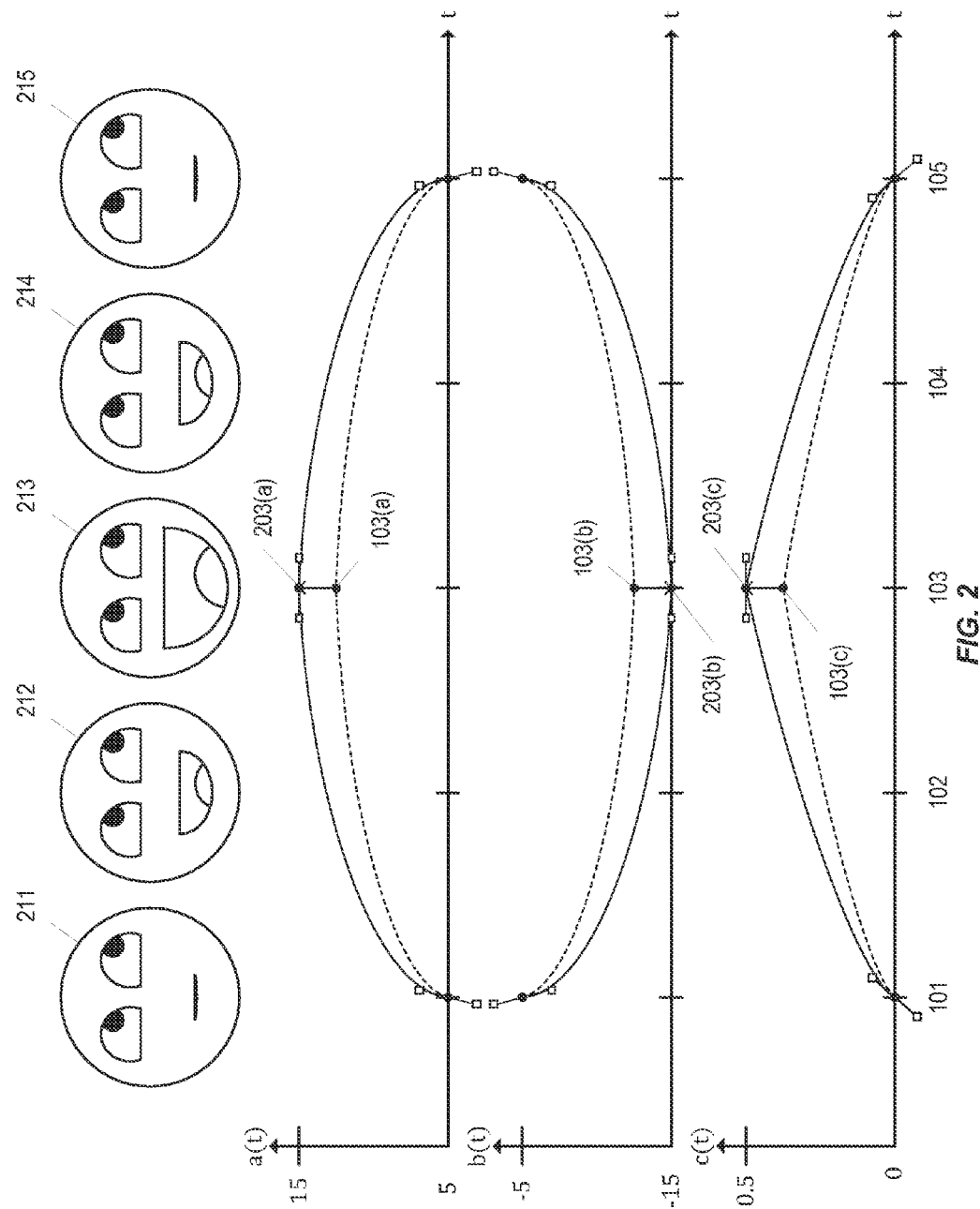
FIG. 2 shows a modification to three animation spline curves and a resulting change to the computer animation.

An animator may often need to modify animation spline curves for artistic, aesthetic, or other reasons. FIG. 2 shows a modification to three animation spline curves and a resulting change to the computer animation. As shown in FIG. 2, the animator may desire to make the character's smile more pronounced (i.e., bigger). To achieve this effect, the animator modifies control points 103(a), 103(b), and 103(c) of FIG. 1 by changing their control point values to 203(a), 203(b), and 203(c), respectively.

Specifically, the animator changes the control point value of spline a(t) at frame 103 from 12.5 to 15. The animator changes the control point value of spline b(t) at frame 103 from −12.5 to −15. The animator changes the control point value for spline c(t) at frame 103 from 0.375 to 0.5. The resulting changes to animation spline curves a(t), b(t), and c(t) can be seen as the difference between those shown in the dotted lines (i.e., the original spline curves), and those shown in solid lines (i.e., the modified spline curves).

The modifications to the animation spline curves are reflected in faces 211-215. Since the values of the spline curves did not change for frames 101 and 105, faces 211 and 215 are the same as face 111 and 115 of FIG. 1. However, since the values of a(t), b(t), and c(t) have changed for frames 102-104, the smiles of faces 212-214 are more exaggerated than those of faces 112-114.

B. Summarizing Animation Spline Curves

Although it may not be particularly time-consuming to modify three animation spline curves (as shown in FIG. 2) if a change to a computer animation is desired, objects in major motion picture computer animations may have dozens or even hundreds of animation variables. In such cases, it may be extremely time and/or labor-intensive to manually change each animation spline curve to achieve a desired modification to the animation.

Figure 3:
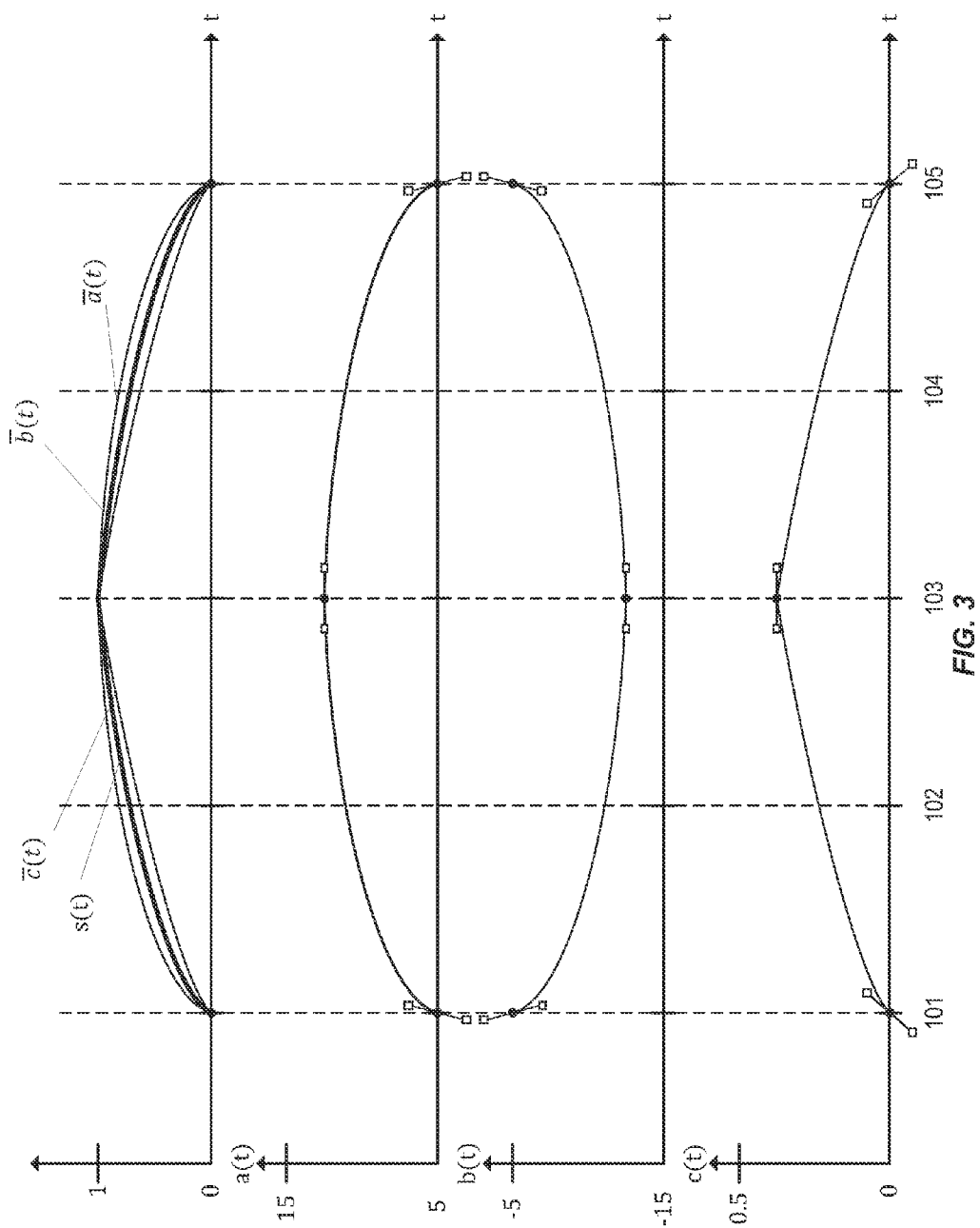
FIG. 3 illustrates a combination of three animation spline curves to generate a summary spline curve.

Embodiments of the invention can address this issue by constructing a summary spline curve that captures the behavior of a plurality of animation spline curves. FIG. 3 illustrates a combination of three animation spline curves a(t), b(t), and c(t) to generate a summary spline curve s(t). In some embodiments, constructing a summary spline curve may comprise normalizing each of the animation spline curves a(t), b(t), and c(t), to determine normalized spline curves $\overline{a}(t)$, $\overline{b}(t)$, and $\overline{c}(t)$, then averaging the normalized animation spline curves to determine a summary spline curve s(t).

Normalizing the animation spline curves may include scaling the animation spline curves to have a range between zero and one, and in some cases, flipping normalized animation spline curves. For example, the top graph in FIG. 3 shows the normalized animation spline curves for (t), b(t), and c(t). As is shown in FIG. 3, spline b(t) has been flipped to match splines a(t) and c(t).

Once the animation spline curves are normalized, they can be averaged to form a summary spline curve. Averaging the normalized animation spline curves may include, for example, taking the arithmetic mean of the values of each curve at one or more control points. The summary spline curve s(t) is shown in bold in FIG. 3. In various embodiments, the summary spline curve can be displayed, such as in computer-aided design (CAD) such as Autodesk Maya, RenderMan, etc.

C. Modifying a Summary Spline Curve

In some embodiments, summary spline curves can be modified such that the modifications are propagated to each animation spline curve used to construct the summary spline curve. For example, FIG. 4 shows a modification to a summary spline curve s(t) that results in modification to three animation spline curves a(t), b(t), and c(t).

Figure 4:
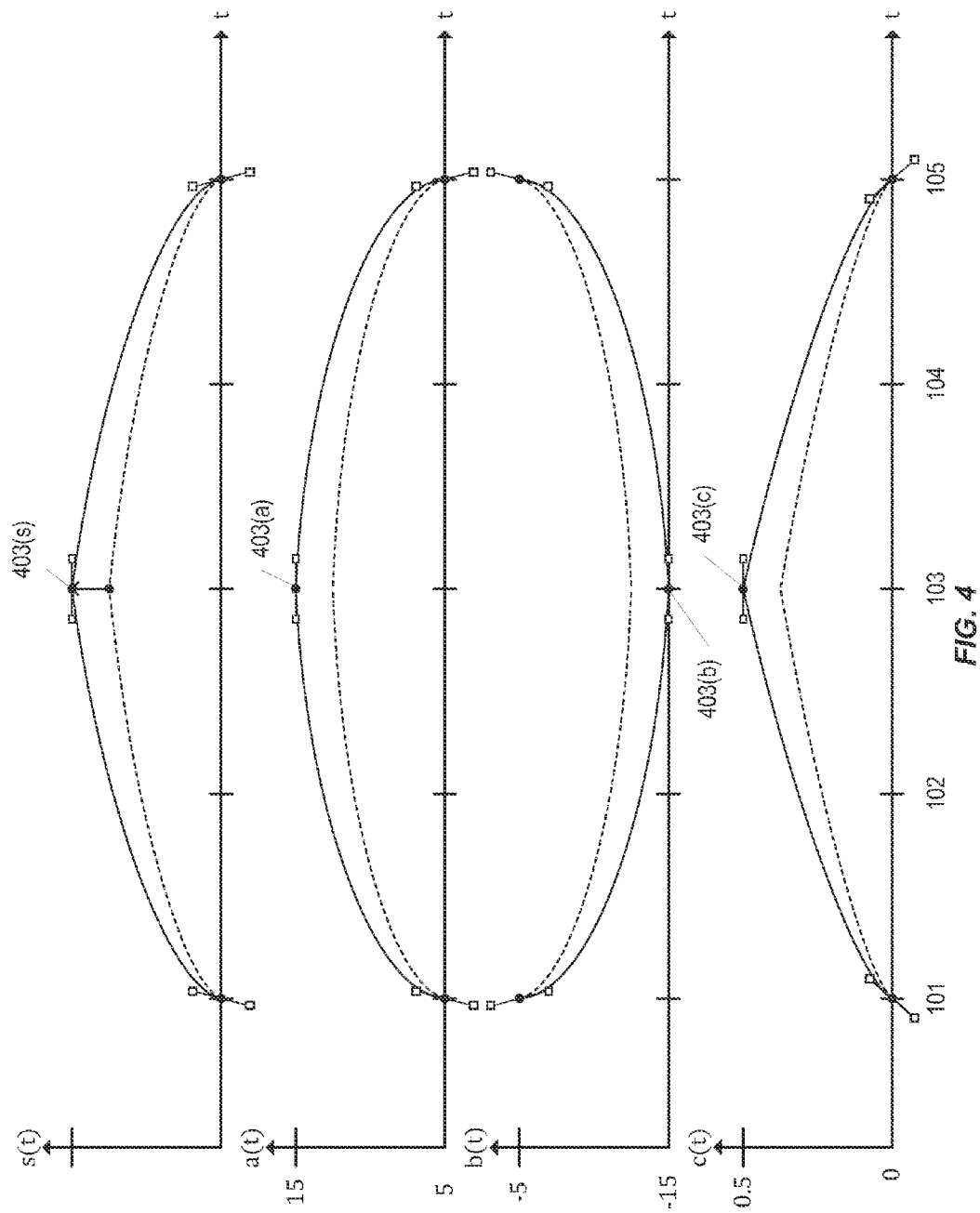
FIG. 4 shows a modification to a summary spline curve that results in modification to three animation spline curves.

As shown in FIG. 4, a control point 403(s) is modified by increasing its value by a third. For example, a user or other animator may drag the control point upward in CAD software. As a result, embodiments can modify control point 403(a) of spline a(t), control point 403(b) of spline b(t), and control point 403(c) of spline c(t). Specifically, the control point value of control point 403(a) is modified from 12.5 to 15. The control point value of control point 403(b) is modified from −12.5 to −15. The control point value of control point 403(c) is modified from 0.375 to 0.5. The resulting changes to animation spline curves a(t), b(t), and c(t) can be seen as the difference between those shown in the dotted lines (i.e., the original animation spline curves), and those shown in solid lines (i.e., the modified animation spline curves).

In addition to modifying a control point value of a summary spline curve as shown in FIG. 4, embodiments can allow a user to modify a control point tangent angle or a control point tangent length of a summary spline curve, and have such changes reflected in a plurality of animation spline curves. FIGS. 5-10 describe some of these embodiments.

II. Summary Spline Construction Methods

Figure 5:
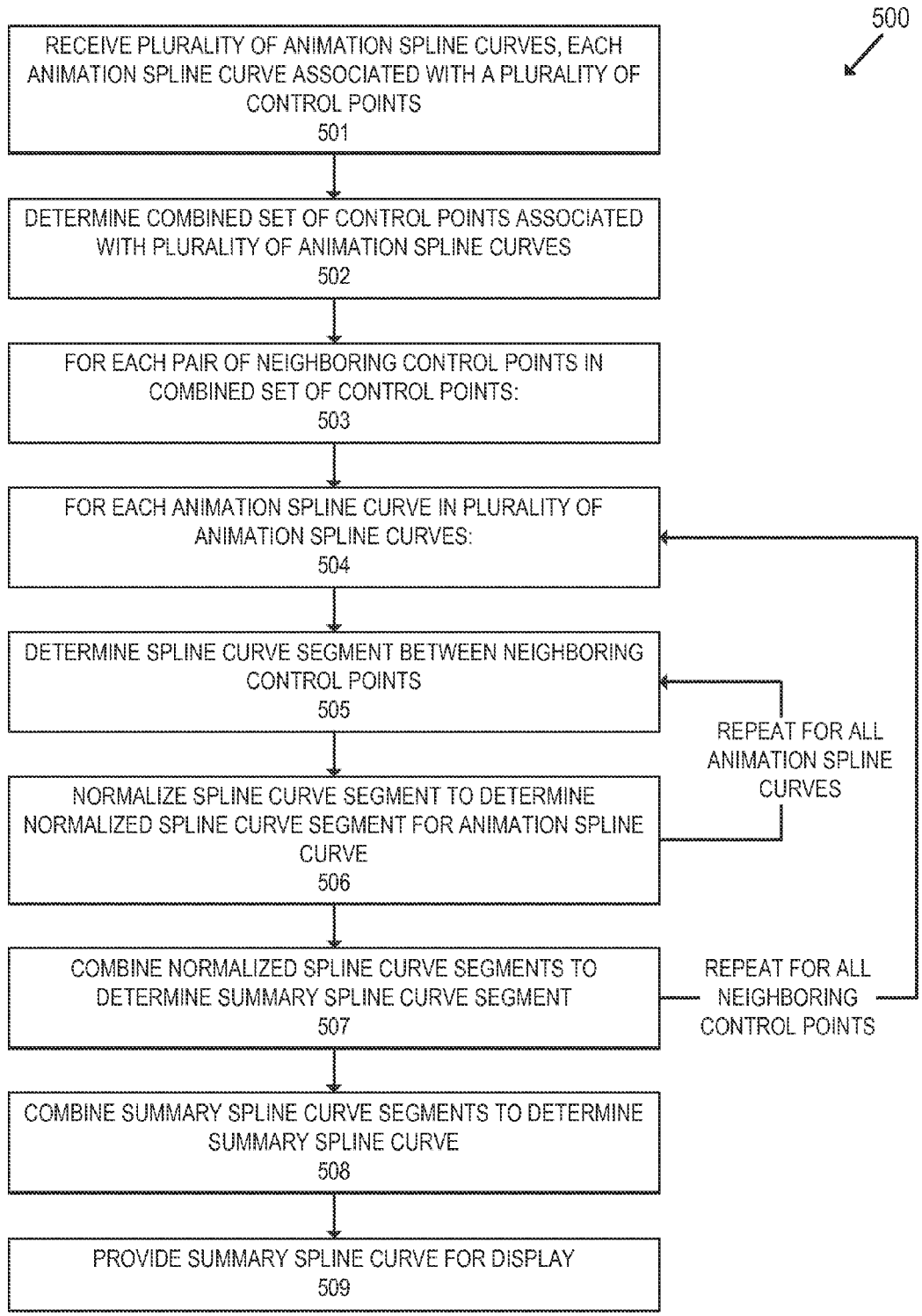
FIG. 5 shows a method of constructing a summary spline curve from a plurality of animation spline curves.

FIG. 5 shows a method 500 of constructing a summary spline curve from a plurality of animation spline curves in accordance with some embodiments. Some or all of the blocks described below can be performed by a computer system, including various subcomponents of a computer system.

At block 501, a plurality of animation spline curves are received. An animation spline curve may include any function or other relation that represents the value of one or more animation variables at a plurality of times or frames. Typically, an animation spline curve is a continuous function such as a Bezier curve or other mathematical spline. An animation spline curve may be associated with a plurality of control points that are used to define the shape of the animation spline curve. The control points may include, for example, a control point value, a control point tangent angle, and/or a control point tangent length.

At block 502, a combined set of control points associated with the plurality of animation spline curves is determined. For example, if each of the animation spline curves is associated with a set of control points, then the combined set of control points may include the union of all sets of control points for the animation spline curves. In some embodiments, the combined set of control points may include a control point at each frame for which there is a control point in any one of the animation spline curves.

At block 503, for each pair of neighboring control points in the combined set of control points, blocks 504-507 are performed. A neighboring control point may include any control point that is adjacent or is otherwise closest in proximity to another control point. In some embodiments, two control points may be neighboring if no other control point in the combined set of control points is at a frame in between the two control points. In some cases, a neighboring control point may be a control point directly preceding (i.e., the frame before) a control point, or following (i.e., the frame after) a control point. In other cases, there may be one or more frames in between neighboring control points. For example, for spline curve a(t) of FIG. 1, control points 101(a) and 103(a) may be neighboring control points.

At block 504, for each pair of animation spline curve in the plurality of animation spline curves, blocks 505-506 are performed.

At block 505, a spline curve segment between the pair of neighboring control points is determined. A spline curve segment may include a subset of an animation spline curve that lies between a first neighboring control point and a second neighboring control point. For example, for spline curve a(t) of FIG. 1, the spline curve between control points 101(a) and 103(a) is one example of a spline curve segment. Similarly, for spline curve b(t) of FIG. 1, the spline curve between control points 101(b) and 103(b) is another example of a spline curve segment.

At block 506, the spline curve segments determined in block 505 are normalized. In some embodiments, normalizing the spline curve segments may include scaling them to have a range or co-domain between 0 and 1 (or any other fixed values). For example, since the spline curve segment of spline a(t) between control points 101(a) and 103(a) changes from a value of 5 units to a value of 15 units, the normalized spline curve segment may translate the spline curve by −5 units, and scale the spline curve by a factor of 1/10 so that a control point of the normalized spline curve at frame 101 has a value of 0, and a control point of the normalized spline curve at frame 103 has a value of 1. More generally, normalizing a spline curve segment can result in changes to one or more properties of each of the control points in a spline curve segment, including control point values, control point tangent angles, and/or control point tangent lengths.

In addition, in some embodiments, normalizing a spline curve segment may include inverting or flipping the spline curve segment. For example, in FIG. 1, spline curves a(t) and c(t) both rise to a local maximum between frames 101 and 103. However, spline curve b(t) falls to a local minimum between these frames. Accordingly, embodiments may invert spline curve b(t) to match the behavior of spline curves a(t) and c(t). More generally, embodiments can use a voting algorithm or other method to determine whether to invert one or more spline curve segments during the normalization process.

FIG. 3 shows examples of normalized spline curves $\bar{a}(t)$, $\bar{b}(t)$, and $\bar{c}(t)$. As shown, all three normalized curves have a range from 0 to 1, and normalized spline curve $\bar{b}(t)$ has been inverted.

Blocks 505 and 506 are repeated to determine a normalized spline curve segment for each of the plurality of animation spline curves.

At block 507, the normalized spline curve segments are combined to determine a summary spline curve segment for the neighboring pair of control points. In some embodiments, combining the normalized spline curve segments may comprise taking an average of each control point in the pair of neighboring control points.

More specifically, each of the normalized spline curve segments may have two control points: a first control point corresponding to one control point in the pair of neighboring control points of the combined set, and a second control point corresponding to the other control point in the pair of neighboring control points. A first control point of the summary spline curve segment can be determined by averaging the properties (e.g., the control point value, the control point tangent angle, the control point tangent length, etc.) of the first control points of each normalized spline curve segment. Similarly, a second control point of the summary spline curve segment can be determined by averaging the properties of the second control points of each normalized spline curve segment. In this manner, the summary spline curve segment can be expressed in terms of two summary spline curve segment control points.

Blocks 507 is repeated to determine a summary spline curve segment for each pair of neighboring control points in the combined set of control points determined at block 502.

At block 508, the summary spline curve segments are combined to determine a summary spline curve. In some embodiments discussed above, each summary spline curve segment may be expressed in terms of two summary spline curve segment control points, each corresponding to one of the control points in a pair of neighboring control points in the combined set. In such embodiments, two summary spline curve segments may share the same control point. For example, the same control point may be the second control point of a first summary spline curve segment, and a first control point a second summary spline curve segment. Accordingly, the summary spline curve segments can be combined by averaging the properties of the second control point of the first summary spline curve segment with the properties of the first control point of the second summary spline curve segment. In this manner, a continuous summary spline curve can be generated from the summary spline curve segments.

At block 509, the summary spline curve is provided for display. For example, the summary spline curve can be shown to an animator or other user via the user interface of CAD software. The summary spline curve can be provided for display to the same system that performs blocks 501-508, or can be provided to a different system for display.

III. Control Point Value Modification Methods

Figure 6:
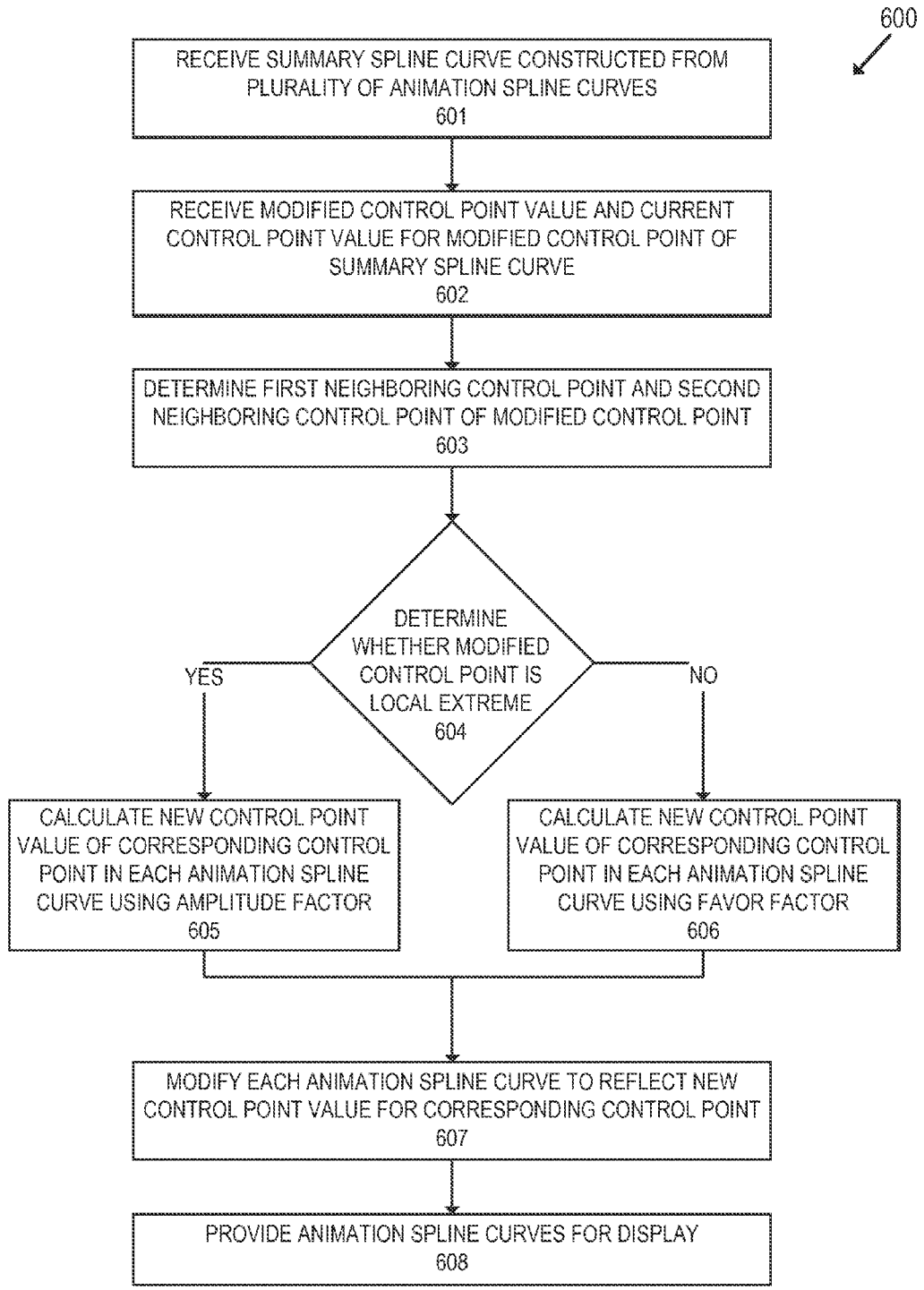
FIG. 6 shows a method of modifying a control point value of a control point in a summary spline curve that results in modification of a plurality of animation spline curves.

FIG. 6 shows a method 600 of modifying a control point value of a control point in a summary spline curve that results in modification of a plurality of animation spline curves. Some or all of the blocks described below can be performed by a computer system, including various subcomponents of a computer system.

At block 601, a summary spline curve constructed from a plurality of animation spine curves is received. In some embodiments, the summary spline curve can be generated in accordance with method 500 of FIG. 5.

At block 602, a modified control point value and a current control point value are received for a modified control point of the summary spline curve. The modified control point value can be any suitable number greater than or less than the current control point value for the control point.

At block 603, a first neighboring control point and a second neighboring control point are determined for the modified control point. A neighboring control point may include any control point that is adjacent or is otherwise closest in proximity to another control point. For example, the first neighboring control point may be control point may be a control point in an earlier frame than the modified control point such that no other control point in the combined set of control points is at a frame in between the first neighboring control point and the modified control point. Similarly, the second neighboring control point may be a control point in a subsequent frame to the modified control point such that no other control point in the combined set of control points is at a frame in between the second neighboring control point and the modified control point.

At decision block 604, it is determined whether the modified control point is a local extreme. In some embodiments, the modified control point may be a local extreme if the modified control point value of the modified control point is either greater than both neighboring control points (i.e., a "local maximum"), or less than both neighboring control points (i.e., a "local minimum"). If the modified control point is a local extreme, the method proceeds to block 605. Otherwise, the method proceeds to block 606.

At block 605, a new control point value of a control point corresponding to the modified control point is determined for each animation spline curve using an amplitude factor. A control point in an animation spline curve may correspond to the modified control point if both control points are at the same frame of the animation. In some embodiments, the method of FIG. 7 may be used to determine a new control point value for each animation spline curve. The method then proceeds to block 607.

At block 606, a new control point value of a control point corresponding to the modified control point is determined for each animation spline curve using an favor factor. A control point in an animation spline curve may correspond to the modified control point if both control points are at the same frame of the animation. In some embodiments, the method of FIG. 8 may be used to determine a new control point value for each animation spline curve. The method then proceeds to block 607.

At block 607, each animation spline curve is modified to reflect the new control point value for the corresponding control point of the animation spline curve.

At block 608, the animation spline curves are provided for display. The animation spline curves can be provided for display to the same system that performs blocks 601-607, or can be provided to a different system for display.

D. Control Point Value Propagation Using an Amplitude Factor

Figure 7:
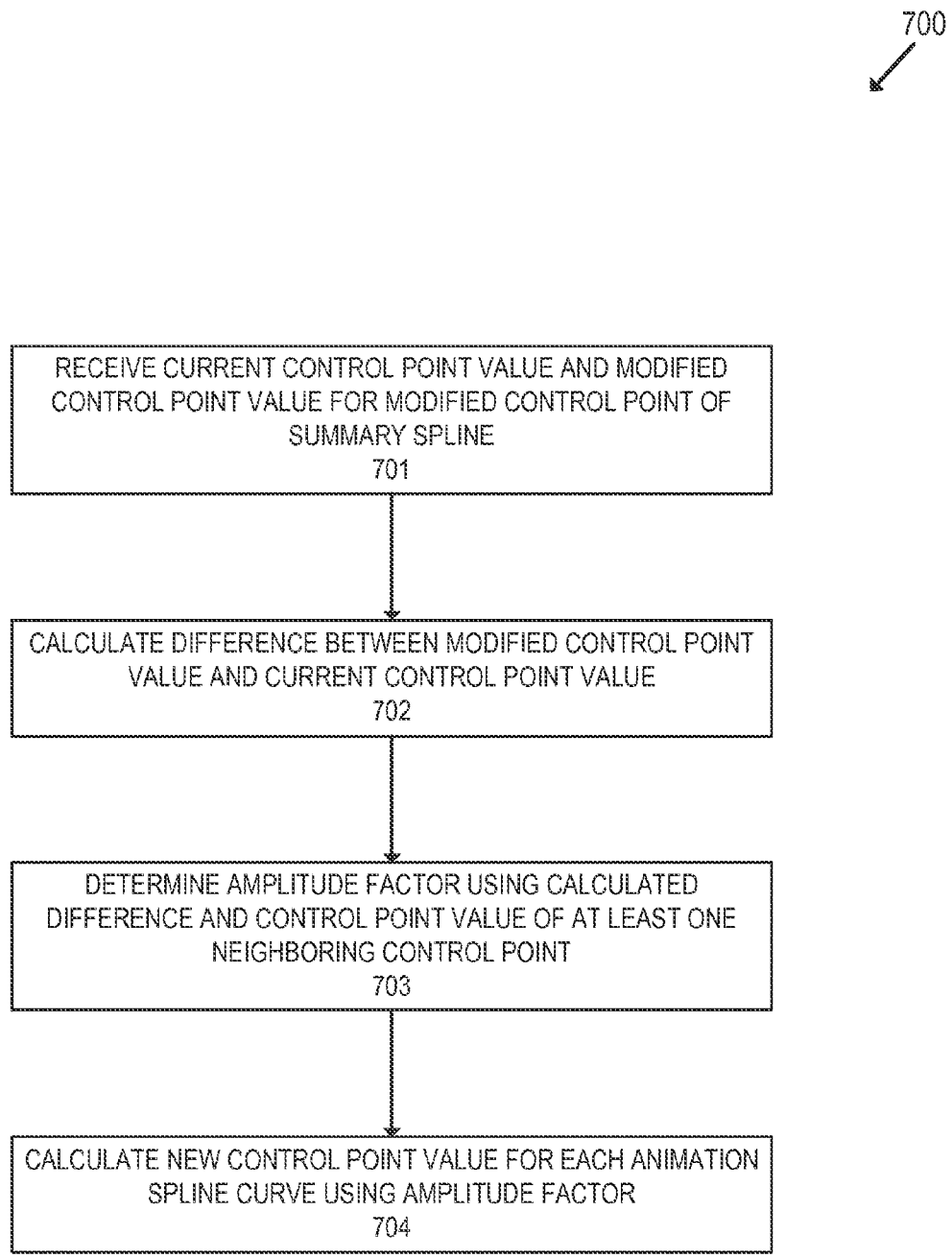
FIG. 7 shows a method of propagating a modification of a control point value of a summary spline curve to an animation spline curves using a favor factor.

FIG. 7 shows a method 700 of propagating a modification to a control point value of a summary spline curve to animation spline curves using an amplitude factor. In some embodiments, method 700 may be performed as a part of block 605 of method 600. Some or all of the blocks described below can be performed by a computer system, including various subcomponents of a computer system.

At block 701, a modified control point value and a current control point value are received for a modified control point of the summary spline curve. The modified control point value can be any suitable number greater than or less than the current control point value for the control point.

At block 702, a difference between the modified control point value and the current control point value of the control point is calculated.

At block 703, an amplitude factor is determined using the difference calculated at block 702 and a control point value of at least one neighboring control point.

In some embodiments, the amplitude factor may be a ratio of the difference between the modified control point value and the current control point value, to a function of the control point value for at least one of the first neighboring control point and the second neighboring control point. Expressed more formally, $$Amp(n) = \frac{s'(n) - s(n)}{f(s(n-1), s(n+1))},$$

where Amp(n) is the amplitude factor for a modification to an nth control point of the summary spline s, where s'(n) is a modified control point value for s, where s(n) is a current control point value for s, where s(n−1) is a control point value for the preceding neighboring control point to point n, where s(n+1) is a control point value for the subsequent neighboring control point to point n, and where f(s(n−1), s(n+1)) is some function of these control point values.

For example, in some embodiments, a user may select either the preceding or subsequent neighboring control point to n to be used to calculate the amplitude factor. In such embodiments, f(s(n−1), s(n+1))=s(n−1) or f(s(n−1), s(n+1))=s(n+1), respectively. In other embodiments, the amplitude factor may depend on the average of the two neighboring control points. In such embodiments, f(s(n−1), s(n+1))=s(n−1)+s(n+1)/2.

At block 704, a new control point value is calculated for a corresponding control point in each animation spline curve using the amplitude factor. A control point in an animation spline curve may correspond to the modified control point if both control points are at the same frame of the animation. In some embodiments, the new control point value may be the product of a current control point value for the corresponding control point and the amplitude factor. Expressed more formally, for a spline a, a'(n)=a(n)×Amp(n), where a'(n) is the new control point value for point n, a(n) is the current control point value for point n, and Amp(n) is the amplitude factor.

E. Control Point Value Propagation Using a Favor Factor

Figure 8:
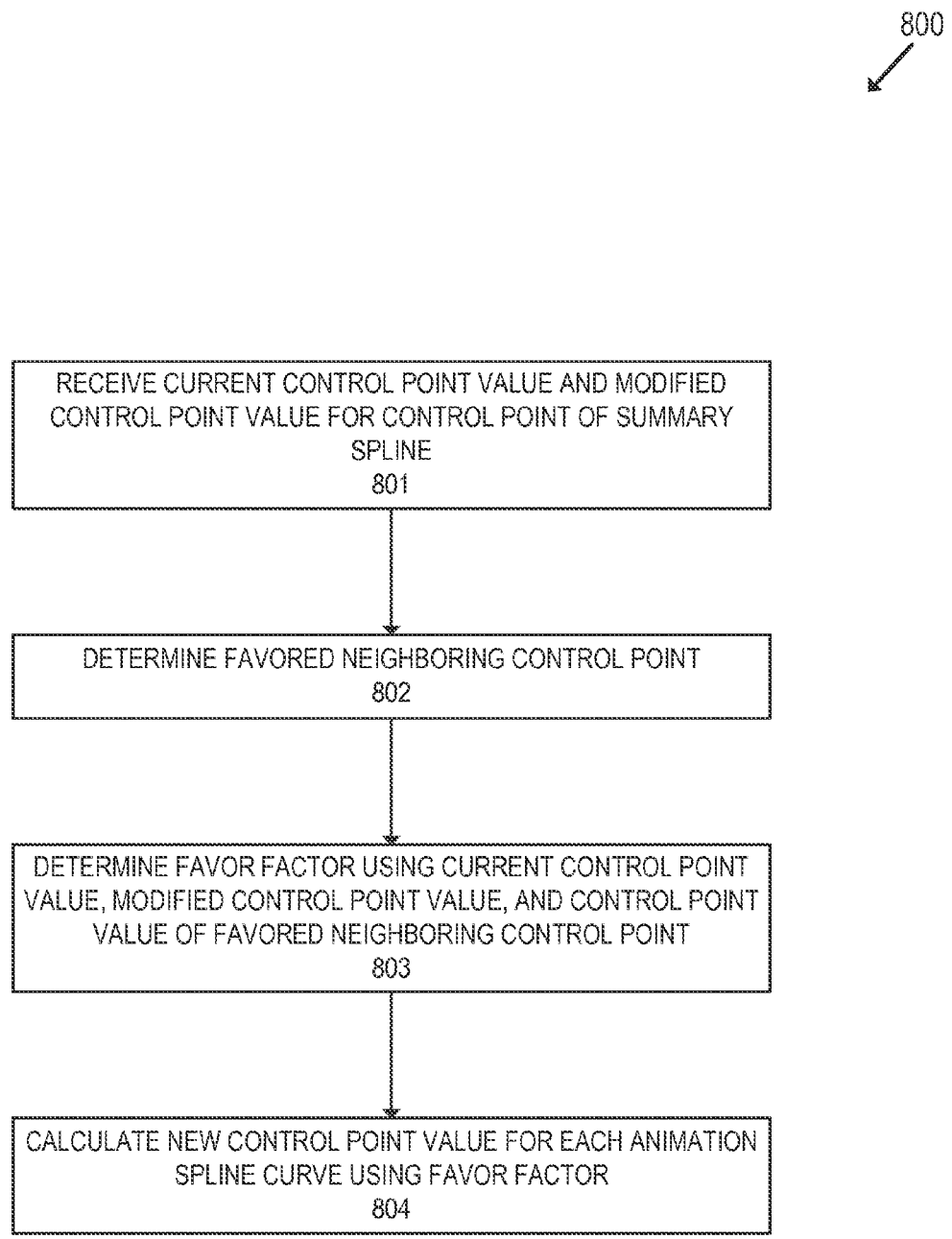
FIG. 8 shows a method of propagating a modification of a control point value of a summary spline curve to an animation spline curves using an amplitude factor.

FIG. 8 shows a method 800 of propagating a modification to a control point value of a summary spline curve to animation spline curves using a favor factor. In some embodiments, method 800 may be performed as a part of block 606 of method 600. Some or all of the blocks described below can be performed by a computer system, including various subcomponents of a computer system.

At block 801, a modified control point value and a current control point value are received for a modified control point of the summary spline curve. The modified control point value can be any suitable number greater than or less than the current control point value for the control point.

At block 802, a favored neighboring control point is determined. The favored neighboring control point may be either of the two neighboring control points, and it may be chosen in any suitable manner. In some embodiments, the favored neighboring control point may be the neighboring control point toward which the modified control point value has moved. In other words, the favored neighboring control point may be the neighboring control point toward which the modified control point value is closer to relative to the current control point value. Put more formally, the favored neighboring control point f(n) for a control point n can be determined using the formula:

$$f(n) = \begin{cases} n-1 & \text{if } |s'(n) - s(n-1)| < |s(n) - s(n-1)| \\ n+1 & \text{if } |s'(n) - s(n+1)| < |s(n) - s(n+1)| \end{cases}$$

Where s is a summary spline curve, s'(n) is the modified control point value of n, s(n) is a current control point value of n, n−1 is the preceding neighboring control point to n, s(n−1) is the control point value of control point n−1, n+1 is the subsequent neighboring control point to n, and s(n+1) is the control point value of control point n+1. As long as control point n is not a local extreme, exactly one of these conditions will be true.

In other embodiments, the favored neighboring control point may be chosen by a user, or in any other suitable manner.

At block 803, a favor factor is determined using the current control point value of the modified control point, the modified control point value, and a control point value of the favored neighboring control point.

In some embodiments, the favor factor may measure a degree to which the modified control point value has moved closer to the value of the favored neighboring control point. For example, the favor factor can be a ratio of the difference between the modified control point value and the value of the favored control point, to the difference between the current control point value and the value of the favored control point. Expressed more formally, a favor factor Fav(n) can be written as:

$$Fav(n) = \frac{s'(n) - s(f)}{s(n) - s(f)}$$

Where s is a summary spline curve, s'(n) is the modified control point value of n, s(n) is a current control point value of n, f is the favored neighboring control point to n, and s(f) is the control point value of favored neighboring control point. In such a formulation, a favor factor close to one indicates that the modified control point value has not changed substantially from the current control point value. In contrast, a favor factor close to zero indicates that the modified control point value is substantially closer in value to that of the favored control point.

At block 804, a new control point value is calculated for a corresponding control point in each animation spline curve using the favor factor. A control point in an animation spline curve may correspond to the modified control point if both control points are at the same frame of the animation. In some embodiments, the new control point value for the corresponding control point may be a weighted average of the current value of the control point and a value of a control point of the animation spline curve that corresponds to the favored neighboring control point. For example, for an animation spline curve a, a new control point value of a'(n) at point n may be written as a'(n)=Fav(n)×a(n)+(1−Fav(n))×a(f), where Fav(n) is the favor factor, a(n) is a current control point value of a at n, and a(f) is a control point value of a at a favored control point f.

IV. Control Point Tangent Angle Modification Methods

Figure 9:
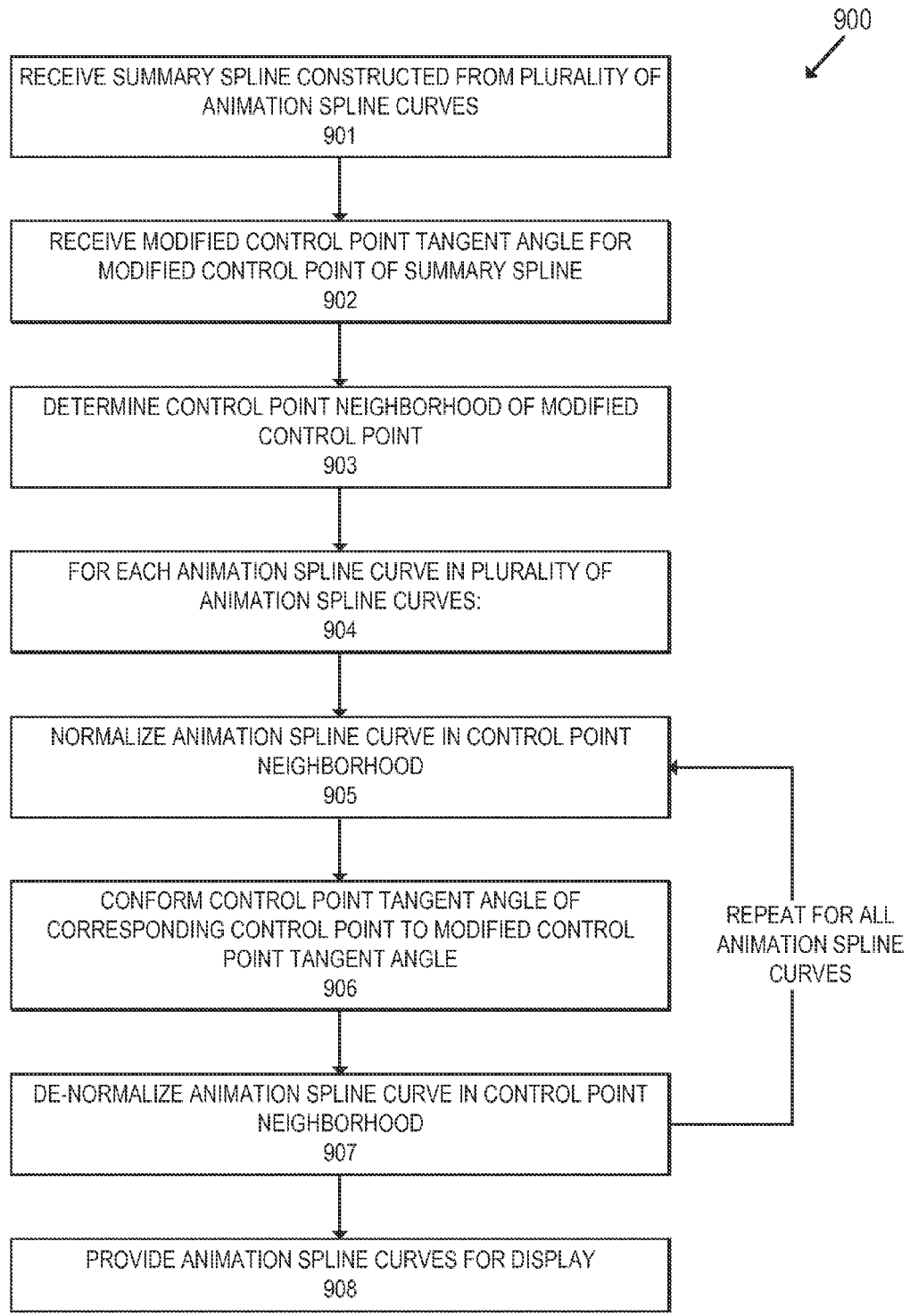
FIG. 9 shows a method of modifying a control point tangent angle of a summary spline curve that results in modification of a plurality of animation spline curves.

FIG. 9 shows a method 900 of modifying a control point tangent angle of a summary spline curve that results in modification of a plurality of animation spline curves. Some or all of the blocks described below can be performed by a computer system, including various subcomponents of a computer system.

At block 901, a summary spline curve constructed from a plurality of animation spine curves is received. In some embodiments, the summary spline curve can be generated in accordance with method 500 of FIG. 5.

At block 902, a modified control point tangent angle is received for a modified control point of the summary spline curve. The modified control point tangent angle can be any suitable tangent angle for the control point.

At block 903, a control point neighborhood is determined for the modified control point. A control point neighborhood may include any suitable plurality of control points in a spline curve. A control point neighborhood may be defined in any suitable manner. For example, in some cases, a control point neighborhood may include all control points preceding a control point until a local extreme control point is reached, and all control points subsequent to the control point until another local extreme control point is reached. In various cases, a control point neighborhood can include any number of control points greater than or equal to two.

At block 904, for each animation spline curve in the plurality of animation spline curves, blocks 905-907 are performed.

At block 905, an animation spline curve is normalized in the control point neighborhood determined at block 903. Normalizing the animation spline curve in the control point neighborhood may include scaling the control points in the neighborhood to have a range or co-domain of control point values between 0 and 1 (or any other fixed values). For example, the normalization process may include an affine transformation on control point neighborhood of the animation spline curve. The transformation can include a translation step to ensure that a local minimum control point in the neighborhood has a value of 0, and a scaling step to ensure that a local maximum control point in the neighborhood has a value of 1. In some embodiments, the affine transformation for an animation spline curve a can be expressed using the formula $\bar{a}=Ma+b$, where $\bar{a}$ is a normalized animation spline curve, M is a linear scaling factor, and b is a translation factor. As a result of the normalization, both control point values and control point tangent angles may change. For example, if a control point neighborhood has a local maximum control point with a value of 6, and a local minimum control point with a value of 2, the local maximum and minimum can be normalized to 1 and 0, respectively using a function $\bar{a}=0.25 \times a-0.5$. Since the scaling factor is 0.25, the slope of all tangents in the neighborhood may be divided by 4.

At block 906, once the animation spline curve is normalized, a control point tangent angle of a corresponding control point in the animation spline curve is conformed to the modified control point tangent angle. A control point in an animation spline curve may correspond to the modified control point if both control points are at the same frame of the animation. Conforming the control point tangent angle of the animation spline curve may include setting the control point tangent angle to that of the modified control point tangent angle of the summary spline curve. For example, if the modified control point tangent angle of the summary spline is 45 degrees, the tangent angle of the corresponding control point in the normalized animation spline curve may also be set to 45 degrees.

At block 907, once the control point tangent angle is conformed, the animation spline curve in the control point neighborhood is de-normalized. In some embodiments, de-normalizing the normalized spline curve may include applying the inverse of the affine transformation applied at block 905. For example, for the normalization transformation $\bar{a}=0.25 \times a-0.5$, an inverse transformation $a=4 \times \bar{a}+2$ may be applied. Blocks 905-907 are repeated for each animation spline curve in the plurality of animation spline curves.

At step 908, the animation spline curves are provided for display. The animation spline curves can be provided for display to the same system that performs blocks 901-907, or can be provided to a different system for display.

V. Control Point Tangent Length Modification Methods

Figure 10:
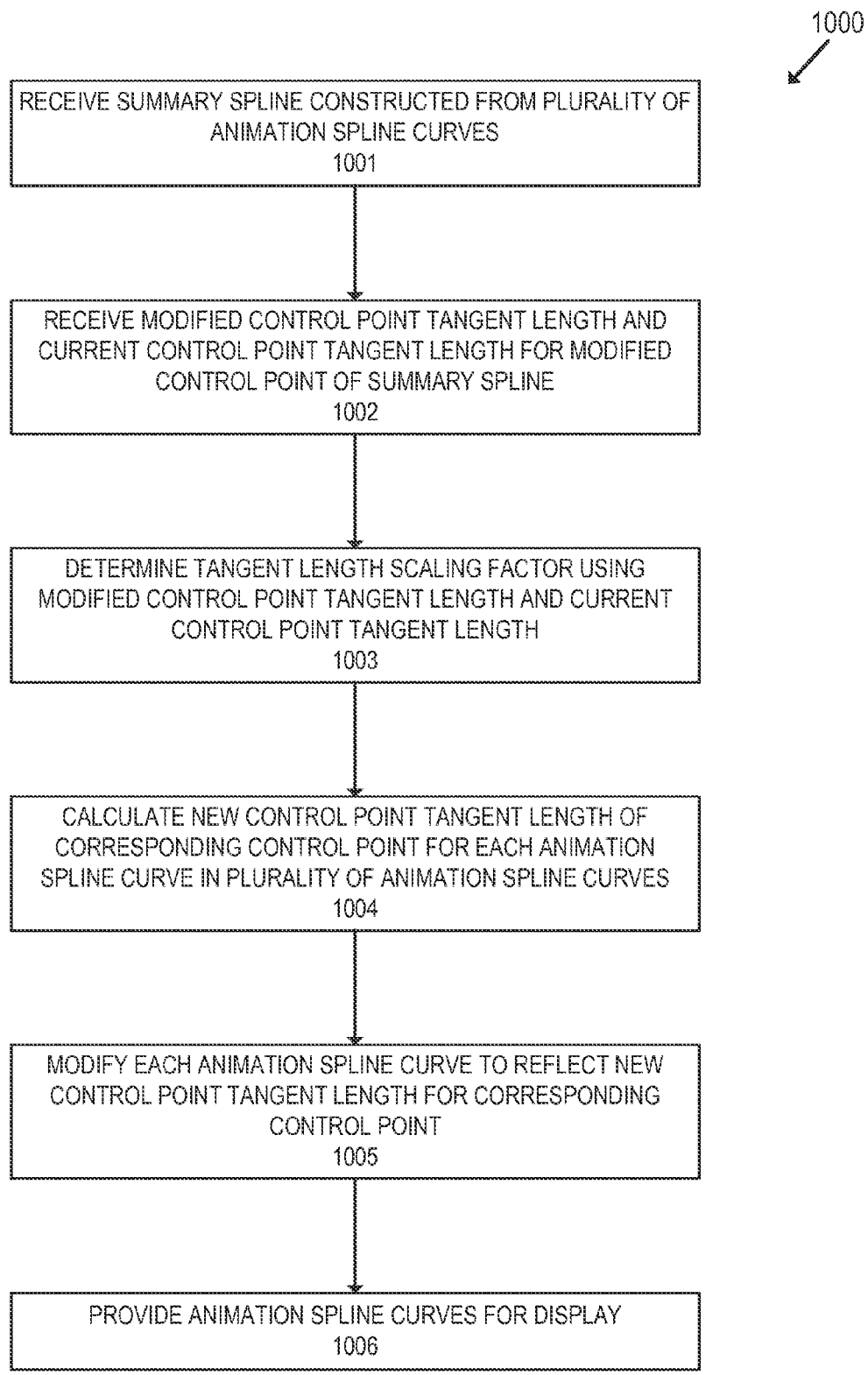
FIG. 10 shows a method of modifying a control point tangent length of a summary spline curve that results in modification of a plurality of animation spline curves.

FIG. 10 shows a method 1000 of modifying a control point tangent length of a summary spline curve that results in modification of a plurality of animation spline curves. Some or all of the blocks described below can be performed by a computer system, including various subcomponents of a computer system.

At block 1001, a summary spline curve constructed from a plurality of animation spine curves is received. In some embodiments, the summary spline curve can be generated in accordance with method 500 of FIG. 5.

At block 1002, a modified control point tangent length and a current control point tangent length are received for a modified control point of the summary spline curve. The modified control point tangent length and the current control point tangent length may be any suitable value (e.g., a scalar value).

At block 1003, a tangent length scaling factor is determined using the modified control point tangent length and the current control point tangent length. For example, in some embodiments, the tangent length scaling factor may be the modified control point tangent length divided by the current control point tangent length.

At block 1004, a new control point tangent length of a corresponding control point is calculated for each animation spline curve in the plurality of animation spline curves. A control point in an animation spline curve may correspond to the modified control point if both control points are at the same frame of the animation. In some embodiments, the new control point tangent length may be the product of a control point tangent length of the corresponding control point and the tangent length scaling factor.

At block 1005, each animation spline curve is modified to reflect the new control point tangent length for the corresponding control point of the animation spline curve.

At block 1006, the animation spline curves are provided for display. The animation spline curves can be provided for display to the same system that performs blocks 1001-1005, or can be provided to a different system for display.

VI. Systems

Figure 11:
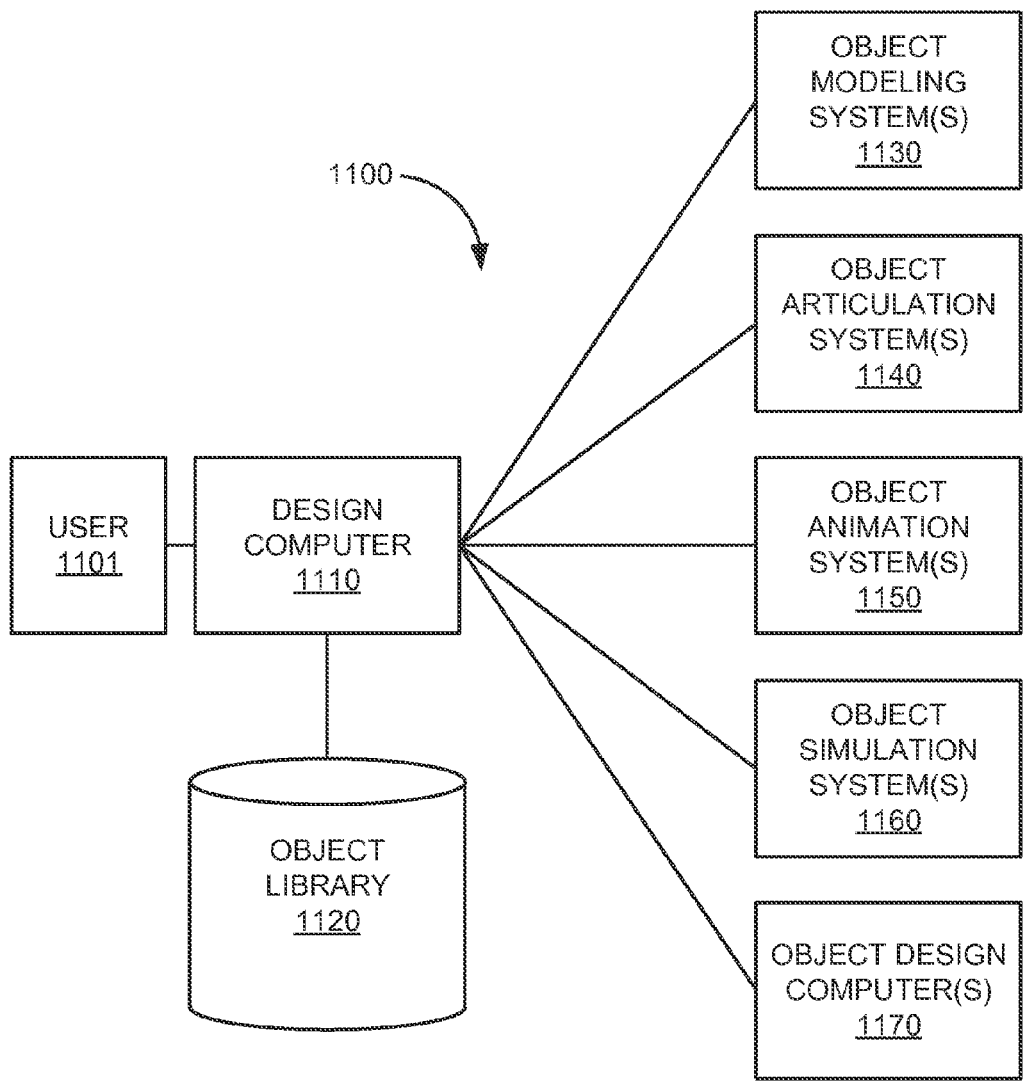
FIG. 11 shows a simplified block diagram of system for creating computer graphics imagery (CGI) and computer-aided animation that may implement or incorporate various embodiments of the invention.

FIG. 11 is a simplified block diagram of system 1100 for creating computer graphics imagery (CGI) and computer-aided animation that may implement or incorporate various embodiments. In this example, system 1100 can include one or more design computers 1110, object library 1120, one or more object modeler systems 1130, one or more object articulation systems 1140, one or more object animation systems 1150, one or more object simulation systems 1160, and one or more object rendering systems 1170. Any of the systems 1130-1170 may be invoked by or used directly by a user of the one or more design computers 1110 and/or automatically invoked by or used by one or more processes associated with the one or more design computers 1110. Any of the elements of system 1100 can include hardware and/or software elements configured for specific functions.

The one or more design computers 1110 can include hardware and software elements configured for designing CGI and assisting with computer-aided animation. Each of the one or more design computers 1110 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 1110 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 1110 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 1110 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 1110 acting as an animator may employ one or more systems or tools to specify motion and position of one or more objects over time to produce an animation.

Object library 1120 can include elements configured for storing and accessing information related to objects used by the one or more design computers 1110 during the various stages of a production process to produce CGI and animation. Some examples of object library 1120 can include a file, a database, or other storage devices and mechanisms. Object library 1120 may be locally accessible to the one or more design computers 1110 or hosted by one or more external computer systems.

Some examples of information stored in object library 1120 can include an object itself, metadata, object geometry, object topology, rigging, control data, animation data, animation cues, simulation data, texture data, lighting data, shader code, or the like. An object stored in object library 120 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 1130 can include hardware and/or software elements configured for modeling one or more objects. Modeling can include the creating, sculpting, and editing of an object. In various embodiments, the one or more object modeling systems 1130 may be configured to generated a model to include a description of the shape of an object. The one or more object modeling systems 1130 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 1130 may further generate model data (e.g., 2D and 3D model data) for use by other elements of system 1100 or that can be stored in object library 1120. The one or more object modeling systems 1130 may be configured to allow a user to associate additional information, metadata, color, lighting, rigging, controls, or the like, with all or a portion of the generated model data.

The one or more object articulation systems 1140 can include hardware and/or software elements configured to articulating one or more computer-generated objects. Articulation can include the building or creation of rigs, the rigging of an object, and the editing of rigging. In various embodiments, the one or more articulation systems 1140 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 1140 may further generate articulation data (e.g., data associated with controls or animations variables) for use by other elements of system 1100 or that can be stored in object library 1120. The one or more object articulation systems 1140 may be configured to allow a user to associate additional information, metadata, color, lighting, rigging, controls, or the like, with all or a portion of the generated articulation data.

The one or more object animation systems 1150 can include hardware and/or software elements configured for animating one or more computer-generated objects. Animation can include the specification of motion and position of an object over time. The one or more object animation systems 1150 may be invoked by or used directly by a user of the one or more design computers 1110 and/or automatically invoked by or used by one or more processes associated with the one or more design computers 1110.

In various embodiments, the one or more animation systems 1150 may be configured to enable users to manipulate controls or animation variables or utilized character rigging to specify one or more key frames of animation sequence. The one or more animation systems 1150 generate intermediary frames based on the one or more key frames.

In some embodiments, the one or more animation systems 1150 may be configured to enable users to specify animation cues, paths, or the like according to one or more predefined sequences. The one or more animation systems 1150 generate frames of the animation based on the animation cues or paths. In further embodiments, the one or more animation systems 1150 may be configured to enable users to define animations using one or more animation languages, morphs, deformations, or the like.

The one or more object animations systems 1150 may further generate animation data (e.g., inputs associated with controls or animations variables) for use by other elements of system 1100 or that can be stored in object library 1120. The one or more object animations systems 1150 may be configured to allow a user to associate additional information, metadata, color, lighting, rigging, controls, or the like, with all or a portion of the generated animation data.

The one or more object simulation systems 1160 can include hardware and/or software elements configured for simulating one or more computer-generated objects. Simulation can include determining motion and position of an object over time in response to one or more simulated forces or conditions. The one or more object simulation systems 1160 may be invoked by or used directly by a user of the one or more design computers 1110 and/or automatically invoked by or used by one or more processes associated with the one or more design computers 1110.

In various embodiments, the one or more object simulation systems 1160 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 1160 may be used to simulate the behavior of objects, such as hair, fur, and cloth, in response to a physics model and/or animation of one or more characters and objects within a computer-generated scene.

The one or more object simulation systems 1160 may further generate simulation data (e.g., motion and position of an object over time) for use by other elements of system 100 or that can be stored in object library 1120. The generated simulation data may be combined with or used in addition to animation data generated by the one or more object animation systems 150. The one or more object simulation systems 1160 may be configured to allow a user to associate additional information, metadata, color, lighting, rigging, controls, or the like, with all or a portion of the generated simulation data.

The one or more object rendering systems 1170 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 1170 may be invoked by or used directly by a user of the one or more design computers 1110 and/or automatically invoked by or used by one or more processes associated with the one or more design computers 1110. One example of a software program embodied as the one or more object rendering systems 1170 can include PhotoRealistic RenderMan, or PRMan, produced by Pixar Animations Studios of Emeryville, Calif.

In various embodiments, the one or more object rendering systems 1170 can be configured to render one or more objects to produce one or more computer-generated images or a set of images over time that provide an animation. The one or more object rendering systems 1170 may generate digital images or raster graphics images.

In various embodiments, a rendered image can be understood in terms of a number of visible features. Some examples of visible features that may be considered by the one or more object rendering systems 1170 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air) shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 1170 may further render images (e.g., motion and position of an object over time) for use by other elements of system 1100 or that can be stored in object library 1120. The one or more object rendering systems 1170 may be configured to allow a user to associate additional information or metadata with all or a portion of the rendered image.

Figure 12:
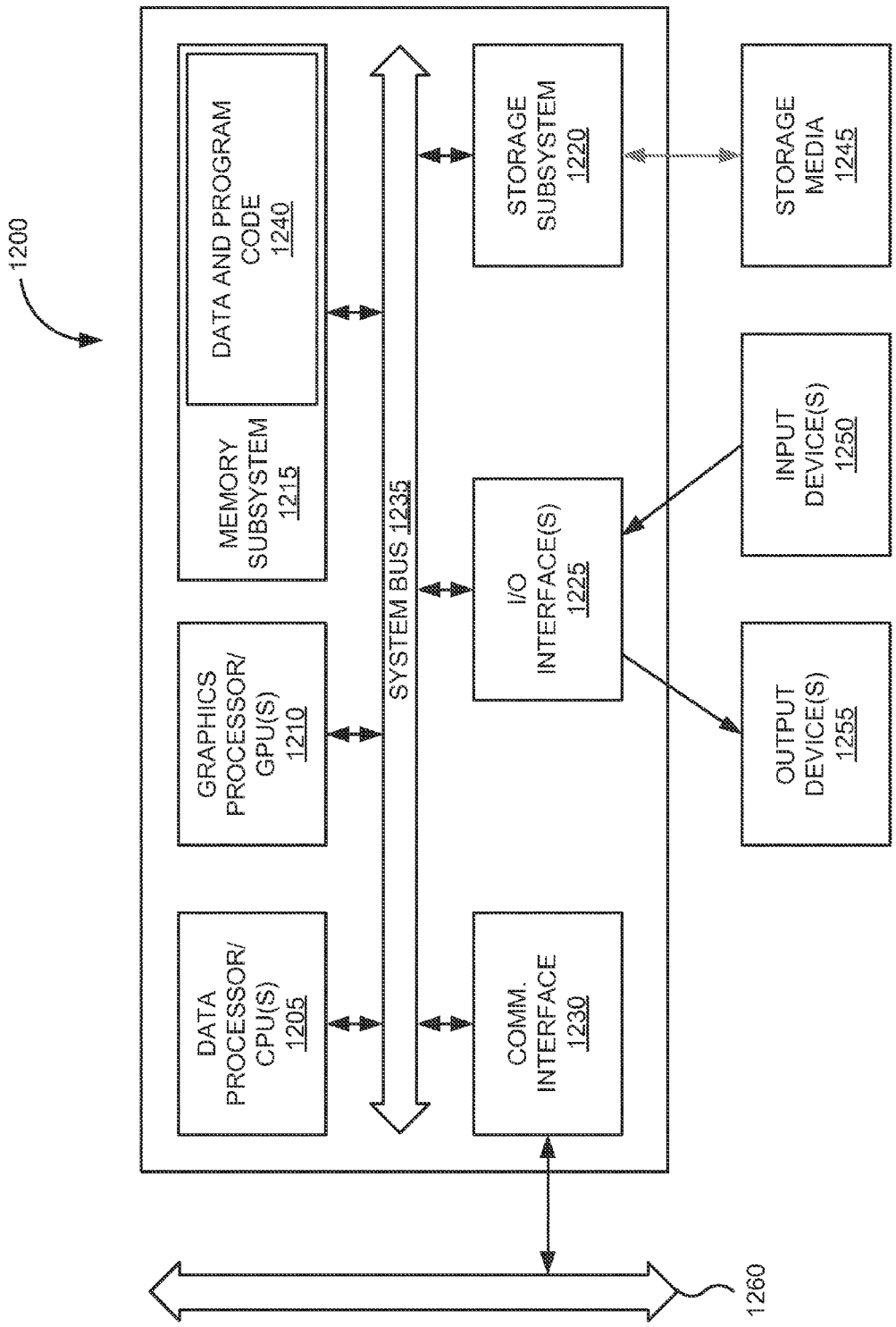
FIG. 12 shows a block diagram of a computer system according to some embodiments of the invention.

FIG. 12 is a block diagram of computer system 1200. FIG. 12 is merely illustrative. In some embodiments, a computer system includes a single computer apparatus, where the subsystems can be the components of the computer apparatus. In other embodiments, a computer system can include multiple computer apparatuses, each being a subsystem, with internal components. Computer system 1200 and any of its components or subsystems can include hardware and/or software elements configured for performing methods described herein.

Computer system 1200 may include familiar computer components, such as one or more one or more data processors or central processing units (CPUs) 1205, one or more graphics processors or graphical processing units (GPUs)

1210, memory subsystem 1215, storage subsystem 1220, one or more input/output (I/O) interfaces 1225, communications interface 1230, or the like. Computer system 1200 can include system bus 1235 interconnecting the above components and providing functionality, such connectivity and inter-device communication.

The one or more data processors or central processing units (CPUs) 1205 can execute logic or program code or for providing application-specific functionality. Some examples of CPU(s) 1205 can include one or more microprocessors (e.g., single core and multi-core) or micro-controllers, one or more field-gate programmable arrays (FPGAs), and application-specific integrated circuits (ASICs). As user herein, a processor includes a multi-core processor on a same integrated chip, or multiple processing units on a single circuit board or networked.

The one or more graphics processor or graphical processing units (GPUs) 1210 can execute logic or program code associated with graphics or for providing graphics-specific functionality. GPUs 1210 may include any conventional graphics processing unit, such as those provided by conventional video cards. In various embodiments, GPUs 1210 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 1210 may include any number of registers, logic units, arithmetic units, caches, memory interfaces, or the like.

Memory subsystem 1215 can store information, e.g., using machine-readable articles, information storage devices, or computer-readable storage media. Some examples can include random access memories (RAM), read-only-memories (ROMS), volatile memories, non-volatile memories, and other semiconductor memories. Memory subsystem 1215 can include data and program code 1240.

Storage subsystem 1220 can also store information using machine-readable articles, information storage devices, or computer-readable storage media. Storage subsystem 1220 may store information using storage media 1245. Some examples of storage media 1245 used by storage subsystem 1220 can include floppy disks, hard disks, optical storage media such as CD-ROMS, DVDs and bar codes, removable storage devices, networked storage devices, or the like. In some embodiments, all or part of data and program code 1240 may be stored using storage sub system 1220.

The one or more input/output (I/O) interfaces 1225 can perform I/O operations. One or more input devices 1250 and/or one or more output devices 1255 may be communicatively coupled to the one or more I/O interfaces 1225. The one or more input devices 1250 can receive information from one or more sources for computer system 1200. Some examples of the one or more input devices 1250 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 1250 may allow a user of computer system 1200 to interact with one or more non-graphical or graphical user interfaces to enter a comment, select objects, icons, text, user interface widgets, or other user interface elements that appear on a monitor/display device via a command, a click of a button, or the like.

The one or more output devices 1255 can output information to one or more destinations for computer system 1200. Some examples of the one or more output devices 1255 can include a printer, a fax, a feedback device for a mouse or joystick, external storage systems, a monitor or other display device, a communications interface appropriately configured as a transceiver, or the like. The one or more output devices 1255 may allow a user of computer system 1200 to view objects, icons, text, user interface widgets, or other user interface elements. A display device or monitor may be used with computer system 1200 and can include hardware and/or software elements configured for displaying information.

Communications interface 1230 can perform communications operations, including sending and receiving data. Some examples of communications interface 1230 may include a network communications interface (e.g. Ethernet, Wi-Fi, etc.). For example, communications interface 1230 may be coupled to communications network/external bus 1260, such as a computer network, a USB hub, or the like. A computer system can include a plurality of the same components or subsystems, e.g., connected together by communications interface 1230 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Computer system 1200 may also include one or more applications (e.g., software components or functions) to be executed by a processor to execute, perform, or otherwise implement techniques disclosed herein. These applications may be embodied as data and program code 1240. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 1215 and/or storage subsystem 1220.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps, blocks, or lines. Thus, embodiments can be directed to computer systems configured to perform the steps, blocks, or lines of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments. However, other embodiments may be directed to specific embodiments relating to each individual aspect, or specific combinations of these individual aspects.

The above description of example embodiments has been presented for the purposes of illustration and description. It is not intended to be exhaustive or to limit the invention to the precise form described, and many modifications and variations are possible in light of the teaching above. The embodiments were chosen and described in order to best explain the principles and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A method of constructing a summary spline curve from a plurality of animation spline curves, the method comprising:
    receiving the plurality of animation spline curves, each animation spline curve associated with a plurality of control points, each animation spline curve representing a characteristic of an object at a plurality of frames in a computer animation;
    determining a combined set of control points comprising control points associated with the plurality of animation spline curves;
    for each pair of neighboring control points in the combined set of control points:
        for each animation spline curve in the plurality of animation spline curves:
            determining a spline curve segment between the neighboring control points; and
            normalizing the spline curve segment to determine a normalized spline curve segment for the animation spline curve; and
        averaging the normalized spline curve segments for each of the animation spline curves to determine a summary spline curve segment for the pair of neighboring control points; and
    combining the summary spline curve segments for each pair of neighboring control points to determine a summary spline curve.

2. The method of claim 1, wherein each of the animation spline curve represents an animation variable associated with the object, and wherein at least some of the animation spline curves represent different animation variables.

3. The method of claim 1, wherein at least one of the plurality of animation spline curves is a second summary spline curve constructed from a second plurality of animation spline curves.

4. The method of claim 1, wherein the plurality of animation spline curves is determined using a model of the object, wherein a hierarchy of the animation spline curves corresponds to a hierarchy of animation variables associated with the object.

5. The method of claim 1, further comprising providing the summary spline curve for display.

6. A method of modifying a summary spline curve constructed from a plurality of animation spline curves, each animation spline curve representing a characteristic of an object at a plurality of frames in a computer animation, the summary spline curve comprising a plurality of control points, each control point associated with a frame in the computer animation and a control point value, the method comprising:
    receiving a modified control point value for a control point of the summary spline curve, wherein the modified control point value for the control point is different from a current control point value for the control point;
    determining a first neighboring control point and a second neighboring control point to the modified control point, wherein the first neighboring control point and the second neighboring control point are associated with neighboring frames in the computer animation;
    if the modified control point is a local extreme:
        calculating a difference between the modified control point value and the current control point value;
        determining an amplitude factor using the calculated difference and a control point value for at least one of the first neighboring control point and the second neighboring control point; and
        for each of the plurality of animation spline curves, determining a new control point value for a control point in the animation spline curve corresponding to the modified control point using the determined amplitude factor;
    otherwise:
        determining a favored neighboring control point;
        calculating a difference between the modified control point value and the current control point value;
        determining a favor factor using the calculated difference and a control point value of the favored control point; and
        for each of the plurality of animation spline curves, determining a new control point value for a control point in the animation spline curve using the determined favor factor.

7. The method of claim 6, wherein the modified control point is a local extreme if a first neighboring control point value for the first neighboring control point is greater than the modified control point value, and a second neighboring control point value for the second neighboring control point is less than the modified control point value.

8. The method of claim 6, wherein the first neighboring control point and the second neighboring control point are associated with frames in the computer animation directly adjacent to a frame associated with the modified control point.

9. The method of claim 6, wherein the first neighboring control point is the favored neighboring control point if the modified control point value is greater than the current control point value, and wherein the second neighboring control point is the favored neighboring control point if the modified control point value is less than the current control point value.

10. The method of claim 6, wherein the favor factor is calculated using a ratio of the difference between the modified control point value and the current control point value, to the control point value of the favored control point.

11. The method of claim 6, wherein determining the new control point value for the control point in the animation spline curve using the favor factor comprises determining a value of the animation spline curve at a location indicated by the favor factor.

12. The method of claim 6, wherein the amplitude factor is calculated using a ratio of the difference between the modified control point value and the current control point value, to the control point value for at least one of the first neighboring control point and the second neighboring control point.

13. The method of claim 6, wherein determining the new control point value for the control point in the animation spline curve using the amplitude factor comprises multiplying the amplitude factor by a current control point value for the control point.

14. The method of claim 6, further comprising providing the animation spline curves for display.

15. A method of modifying a summary spline curve constructed from a plurality of animation spline curves, each animation spline curve representing a characteristic of an object at a plurality of frames in a computer animation, the summary spline curve comprising a plurality of control points, each control point associated with a frame in the computer animation and a control point tangent angle, the method comprising:
  receiving a modified control point tangent angle for a modified control point of the summary spline curve;
  determining a control point neighborhood for the modified control point, wherein the control point neighborhood comprises a subset of the plurality of control points in the summary spline curve;
  for each animation spline curve in the plurality of animation spline curves:
    normalizing the animation spline curve in the control point neighborhood to determine a normalized animation spline curve;
    conforming a control point tangent angle of a corresponding control point in the normalized animation spline curve to the modified control point tangent angle; and
    de-normalizing the animation spline curve in the control point neighborhood.

16. The method of claim 15, wherein the control point neighborhood for the modified control point comprises control points between the closest extreme control point that is before the modified control point, to the closest extreme control point that is after the modified control point.

17. The method of claim 15, further comprising the animation spline curves for display.

18. A computer product comprising a non-transitory computer readable medium storing a plurality of instructions that, when executed on one or more processors of a computer system, control the computer system to perform operations for constructing a summary spline curve from a plurality of animation spline curves, the operations comprising:
  receiving the plurality of animation spline curves, each animation spline curve associated with a plurality of control points, each animation spline curve representing a characteristic of an object at a plurality of frames in a computer animation;
  determining a combined set of control points comprising control points associated with the plurality of animation spline curves;
  for each pair of neighboring control points in the combined set of control points:
    for each animation spline curve in the plurality of animation spline curves:
      determining a spline curve segment between the neighboring control points; and
      normalizing the spline curve segment to determine a normalized spline curve segment for the animation spline curve; and
    averaging the normalized spline curve segments for each of the animation spline curves to determine a summary spline curve segment for the pair of neighboring control points; and
  combining the summary spline curve segments for each pair of neighboring control points to determine a summary spline curve.

19. The computer product of claim 18, wherein each of the animation spline curve represents an animation variable associated with the object, and wherein at least some of the animation spline curves represent different animation variables.

20. The computer product of claim 18, wherein at least one of the plurality of animation spline curves is a second summary spline curve constructed from a second plurality of animation spline curves.

21. The computer product of claim 18, wherein the plurality of animation spline curves is determined using a model of the object, wherein a hierarchy of the animation spline curves corresponds to a hierarchy of animation variables associated with the object.

22. The computer product of claim 18, wherein the operations further comprise providing the summary spline curve for display.

23. A computer product comprising a non-transitory computer readable medium storing a plurality of instructions that, when executed on one or more processors of a computer system, control the computer system to perform operations for modifying a summary spline curve constructed from a plurality of animation spline curves, each animation spline curve representing a characteristic of an object at a plurality of frames in a computer animation, the summary spline curve comprising a plurality of control points, each control point associated with a frame in the computer animation and a control point value, the operations comprising:
  receiving a modified control point value for a control point of the summary spline curve, wherein the modified control point value for the control point is different from a current control point value for the control point;
  determining a first neighboring control point and a second neighboring control point to the modified control point, wherein the first neighboring control point and the second neighboring control point are associated with neighboring frames in the computer animation;
  if the modified control point is a local extreme:
    calculating a difference between the modified control point value and the current control point value;
    determining an amplitude factor using the calculated difference and a control point value for at least one of the first neighboring control point and the second neighboring control point; and
    for each of the plurality of animation spline curves, determining a new control point value for a control point in the animation spline curve corresponding to the modified control point using the determined amplitude factor;
  otherwise:
    determining a favored neighboring control point;
    calculating a difference between the modified control point value and the current control point value;

determining a favor factor using the calculated difference and a control point value of the favored control point; and for each of the plurality of animation spline curves, determining a new control point value for a control point in the animation spline curve using the determined favor factor.

24. The computer product of claim 23, wherein the modified control point is a local extreme if a first neighboring control point value for the first neighboring control point is greater than the modified control point value, and a second neighboring control point value for the second neighboring control point is less than the modified control point value.

25. The computer product of claim 23, wherein the first neighboring control point and the second neighboring control point are associated with frames in the computer animation directly adjacent to a frame associated with the modified control point.

26. The computer product of claim 23, wherein the first neighboring control point is the favored neighboring control point if the modified control point value is greater than the current control point value, and wherein the second neighboring control point is the favored neighboring control point if the modified control point value is less than the current control point value.

27. The computer product of claim 23, wherein the favor factor is calculated using a ratio of the difference between the modified control point value and the current control point value, to the control point value of the favored control point.

28. The computer product of claim 23, wherein determining the new control point value for the control point in the animation spline curve using the favor factor comprises determining a value of the animation spline curve at a location indicated by the favor factor.

29. The computer product of claim 23, wherein the amplitude factor is calculated using a ratio of the difference between the modified control point value and the current control point value, to the control point value for at least one of the first neighboring control point and the second neighboring control point.

30. The computer product of claim 23, wherein determining the new control point value for the control point in the animation spline curve using the amplitude factor comprises multiplying the amplitude factor by a current control point value for the control point.

31. The computer product of claim 23, wherein the operations further comprise providing the animation spline curves for display.

32. A computer product comprising a non-transitory computer readable medium storing a plurality of instructions that, when executed on one or more processors of a computer system, control the computer system to perform operations for modifying a summary spline curve constructed from a plurality of animation spline curves, each animation spline curve representing a characteristic of an object at a plurality of frames in a computer animation, the summary spline curve comprising a plurality of control points, each control point associated with a frame in the computer animation and a control point tangent angle, the operations comprising:

receiving a modified control point tangent angle for a modified control point of the summary spline curve;

determining a control point neighborhood for the modified control point, wherein the control point neighborhood comprises a subset of the plurality of control points in the summary spline curve;

for each animation spline curve in the plurality of animation spline curves:

normalizing the animation spline curve in the control point neighborhood to determine a normalized animation spline curve;

conforming a control point tangent angle of a corresponding control point in the normalized animation spline curve to the modified control point tangent angle; and de-normalizing the animation spline curve in the control point neighborhood.

33. The computer product of claim 32, wherein the control point neighborhood for the modified control point comprises control points between the closest extreme control point that is before the modified control point, to the closest extreme control point that is after the modified control point.

34. The computer product of claim 32, wherein the operations further comprise the animation spline curves for display.

* * * * *